United States Patent [19]

Bennett, Jr. et al.

[11] 4,373,064
[45] Feb. 8, 1983

[54] POLYPHENYLENE ETHER COMPOSITIONS

[75] Inventors: James G. Bennett, Jr., Menands; Gim F. Lee, Jr., Albany, both of N.Y.

[73] Assignee: General Electric Company, Pittsfield, Mass.

[21] Appl. No.: 246,383

[22] Filed: Mar. 23, 1981

Related U.S. Application Data

[63] Continuation of Ser. No. 846,544, Oct. 28, 1977, abandoned, which is a continuation of Ser. No. 725,740, Sep. 23, 1976, abandoned, which is a continuation of Ser. No. 283,093, Aug. 23, 1972, abandoned.

[51] Int. Cl.³ .................... C08L 71/04; C08L 51/04
[52] U.S. Cl. ............................................... 525/68
[58] Field of Search ............... 260/876, 40 R; 525/68

[56] References Cited

U.S. PATENT DOCUMENTS

| | | | |
|---|---|---|---|
| 3,257,357 | 6/1966 | Stamatoff | 260/47 |
| 3,257,358 | 6/1966 | Stamatoff | 260/47 |
| 3,284,542 | 11/1966 | Carrock | 260/880 |
| 3,306,874 | 2/1967 | Hay | 260/47 |
| 3,306,875 | 2/1967 | Hay | 260/47 |
| 3,361,851 | 1/1968 | Gowan | 260/897 |
| 3,379,792 | 4/1968 | Finholt | 260/857 |
| 3,383,340 | 5/1968 | MacCallum | 260/3 |
| 3,383,435 | 5/1968 | Cizek | 260/874 |
| 3,515,774 | 6/1970 | Lee | 260/880 |
| 3,551,523 | 12/1970 | Killoran | 260/880 |
| 3,579,612 | 5/1971 | Lowell | 260/880 |
| 3,600,466 | 8/1971 | Moriguchi | 260/880 |
| 3,639,506 | 2/1972 | Haaf | 260/876 |
| 3,639,508 | 2/1972 | Kambour | 260/876 |
| 3,663,654 | 5/1972 | Haaf | 260/876 |
| 3,663,661 | 5/1972 | Katchman | 260/876 |
| 3,825,625 | 7/1974 | Kudo | 260/880 R |

FOREIGN PATENT DOCUMENTS 1180085 2/1970 United Kingdom .

Primary Examiner—Paul Lieberman
Attorney, Agent, or Firm—Hedman, Casella, Gibson & Costigan

[57] ABSTRACT

There are provided thermoplastic compositions comprising a polyphenylene ether and a rubber modified polystyrene resin having a discontinuous phase of polystyrene particles englobed in diene rubber membranes, the particles being between about 0.1 and 0.7 microns in diameter. Such compositions provide molded articles with substantial and unexpected improvements in impact resistance and ability to transmit light in comparison with known compositions of such rubber modified polystyrenes alone or those of other polystyrenes combined with polyphenylene ethers.

7 Claims, 2 Drawing Figures

POLYPHENYLENE ETHER COMPOSITIONS

CROSS-REFERENCE TO RELATED APPLICATIONS

This is a continuation of application Ser. No. 846,544, filed Oct. 28, 1977, abandoned, which is a continuation of application Ser. No. 725,740, filed Sept. 23, 1976, abandoned, which in turn is a continuation of application Ser. No. 283,093, filed Aug. 23, 1972, abandoned.

This invention relates to thermoplastic resin compositions and, more particularly, to high impact strength, transparent thermoplastic compositions comprising a polyphenylene ether and a rubber modified polystyrene resin comprising a continuous polystyrene phase containing small dispersed particles of polystyrene, each englobed with a diene rubber membrane.

BACKGROUND OF THE INVENTION

The polyphenylene ethers are known and described in numerous publications, including Hay, U.S. Pat. Nos. 3,306,874 and 3,306,875; and Stamatoff, U.S. Pat. Nos. 3,257,357 and 3,257,358, all incorporated herein by reference. They are useful for many commercial applications requiring high temperature resistance and, because they are thermoplastic, they can be formed into films, fibers and molded articles. In spite of these desirable properties, parts molded from polyphenylene ethers are somewhat brittle due to poor impact strength. In addition, the relatively high melt viscosities and softening points are considered a disadvantage for many uses. Films and fibers can be formed from polyphenylene ethers on a commercial scale using solution techniques, but melt processing is commercially unattractive because of the required high temperatures needed to soften the polymer and the problems associated therewith such as instability and discoloration. Such techniques also require specially designed process equipment to operate at elevated temperatures. Molded articles can be formed by melt processing techniques, but, again, the high temperatures required are undesirable.

It is known in the art that the properties of the polyphenylene ethers can be materially altered by forming compositions with other polymers. For example, U.S. Pat. No. 3,379,792 discloses that flow properties of polyphenylene ethers are improved by preparing a composition thereof with from about 0.1 to 25 parts by weight of a polyamide. In U.S. Pat. No. 3,361,851 polyphenylene ethers are formed into compositions with polyolefins to improve impact strength and resistance to aggressive solvents. In U.S. Pat. No. 3,383,435, incorporated herein by reference, there is provided a means to simultaneously improve the melt processability of the polyphenylene ethers and upgrade many properties of polystyrene resins. The latter patent discloses that polyphenylene ethers and polystyrene resins, including many modified polystyrenes are combinable in all proportions to provide compositions having many properties improved over those of either of the components.

Preferred embodiments of U.S. Pat. No. 3,383,435 are compositions comprising a rubber modified high-impact polystyrene and a poly-(2,6-dialkyl-1,4-phenylene)ether. Such compositions are important commercially because they provide both an improvement in the melt processability of the polyphenylene ether and an improvement in the impact resistance of parts molded from the compositions. Furthermore, such compositions of the polyphenylene ether and the rubber modified high-impact polystyrene may be custom formulated to provide pre-determined properties ranging between those of the polystyrene resin and those of the polyphenylene ether by controlling the ratio of the two polymers. The reason for this is that the compositions exhibit a single set of thermodynamic properties rather than the two distinct sets of properties, i.e., one for each of the components of the composition, as is typical with compositions or blends of the prior art.

In preferred embodiments of U.S. Pat. No. 3,383,435, rubber modified polystyrenes are used in compositions with polyphenylene ethers because they provide an increase in toughness, e.g., resistance to impact fracture. However, the use of commercially available graft type rubber modified high impact polystyrenes, such as the LUSTREX HT-88 employed in Example 7 to U.S. Pat. No. 3,383,435, causes a sacrifice in transparency, possibly due to scattering of light by the dispersed elastomeric particulate phase in the rubber modified polystyrene. Moreover, the average such rubber particles are greater in diameter than about 1 micron, because it has been stated often that if smaller particles are used, impact strength will be lowered.

In British Pat. No. 1,180,085, it is disclosed that careful attention to the morphology, i.e., the size and nature of the dispersed phase, in copolymers comprising alkyl acrylates and styrene monomers, rendered impact resistant by inclusion of rubber particles, will lead to enhanced impact strength, without loss in transparency, even though very small particles are used. It is suggested in the British patent that the acrylate copolymer should fill the inside of dispersed globular particles, and that each particle should have a thin rubbery membrane or shell surrounding it.

The said British patent states, however, that to try the same technique with polystyrene alone is unsuccessful—the product will mold into a material of low impact strength and, also significantly, the resin will be poor in transparency. On page 15 of the British patent, this failure of polystyrene to qualify as a suitable, useful composition is laid, at least in part, to the magnitude of the difference between the refractive index of the rubber component, and the resin, i.e., homopolystyrene, component. It is stated that such difference must not be in excess of 0.005 refractive index units.

Thus the British patent expressly teaches that the only useful compositions must always include an alkyl methacrylate in the thermoplastic matrix and further that there never can be greater than a 0.005 difference in refractive index between that of the rubber and that of the thermoplastic. Moreover, there is no suggestion that such compositions will be useful to modify other thermoplastic resins, and carry their transparency into such modified compositions and, particularly, there is no suggestion to use any such resins, and especially entirely polystyrene based resins, in compositions with polyphenylene ethers.

In view of the above, it has now unexpectedly been found that a rubber modified polystyrene in which polystyrene is englobed by a diene rubber membrane and dispersed in tiny particles throughout a polystyrene matrix will combine in all proportions with polyphenylene ether resins to give compositions which are both transparent and tough. The unusual morphology of the rubber modified polystyrene seems to be responsible for the observed advantages. Compositions of polyphenylene ether with a rubber modified polystyrene containing particles in which many polystyrene inclusions are present, are both opaque and not as tough. Moreover, a refractive index difference of 0.05 units has been found to be acceptable in the present compositions, even though the British patent states that the difference should be no more than 0.005 units (in cases where polyphenylene ethers were not present).

DESCRIPTION OF THE INVENTION

According to the present invention, in its broadest aspects, there are provided thermoplastic compositions with unexpectedly high impact resistance and freedom from opacity comprising a polyphenylene ether, and a rubber modified polystyrene, the rubber modified polystyrene comprising a polystyrene matrix in which there is uniformly dispersed a discontinuous phase comprising particles of a styrene homopolymer englobulated in a diene rubber membrane, said particles having an average size ranging from about 0.1 to about 0.7 microns, and the membrane thickness being not in excess of ¼ the diameter of the respective particle. The rubber content will range from about 1 to about 10% by weight of the rubber modified polysytrene component. In general, the compositions according to this invention are prepared by combining said polyphenylene ether and a rubber modified polystyrene to obtain a composition which also has at least two phases, one of which is discontinuous and comprises the rubber-englobed polystyrene particles and the continuous phase comprising polyphenylene ether and polystyrene. Such compositions may be molded to shape using conventional molding procedures.

Therefore, according to a preferred aspect of this invention, there are provided high impact strength thermoplastic compositions comprising
(a) from 1 to 99 parts by weight of a polyphenylene ether resin and
(b) from 99 and 1 part by weight of a rubber modified polystyrene resin, the rubber modified polystyrene containing a disperse phase of polystyrene englobed with a polybutadiene or rubbery copolymer of butadiene with up to about 35% by weight of polystyrene and the rubber optionally including homopolystyrene grafted side chains. Most preferably, in the rubber modified polystyrene component, the rubber will comprise from about 3 to 8% by weight.

Figure 1:
FIG. 1 is an electron photomicrograph, 30,000 diameters magnification, of a section of rubber modified polystyrene, which would not be used in this invention, showing the prevailing morphology of the rubber particles in all commercial high impact polystyrenes prepared by graft polymerizations. The numerous "salami" like spots within each particle are due to polystyrene inclusions throughout each particle.
Figure 2:
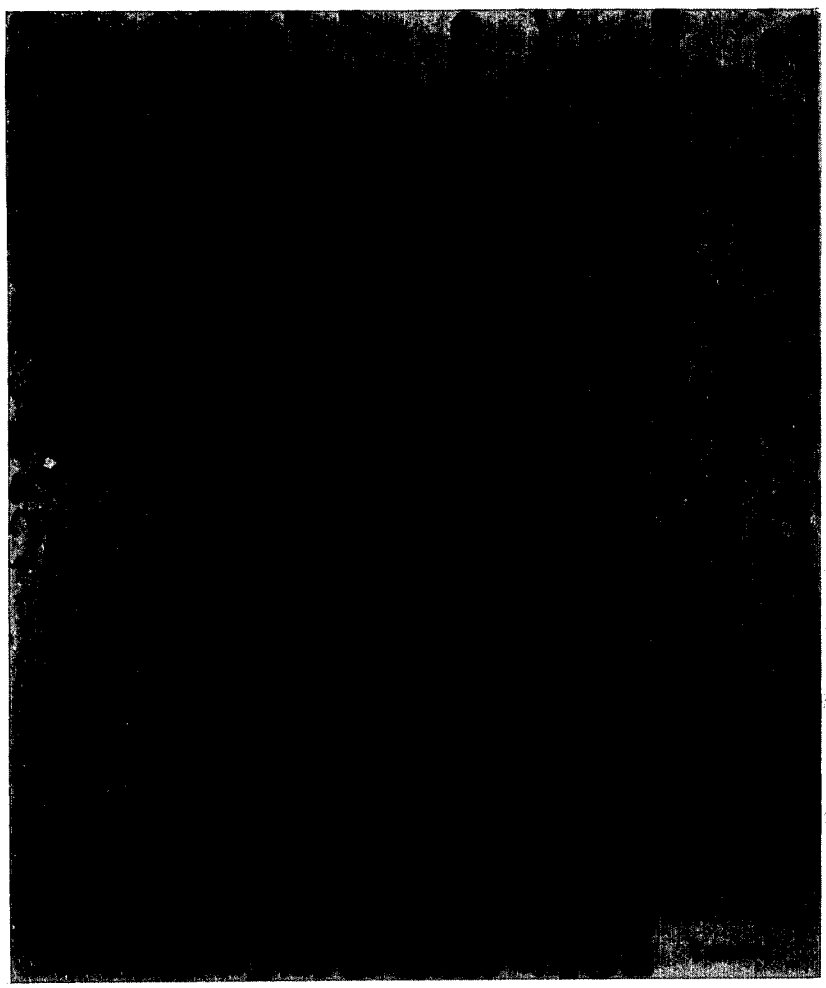
FIG. 2 is an electron photomicrograph, also at 30,000 diameters magnification, of a section of rubber modified polystyrene, which would be useful in this invention. In this case the discontinuous, particulate phase is seen to consist of only a very few (one in most cases) of polystyrene (light areas) inclusions surrounded by a thin diene rubber (dark area) membrane or shell. The particle size is seen to range from about 0.1 to about 0.7 microns.

Methods to determine the morphology of resin systems are well known to those skilled in the art. One convenient method comprises examination of electron microscope photographs of mounted, sectioned specimens. Two such photographs are shown in FIGS. 1 and 2. The techniques are well known to those skilled in the art and are described in Encyclopedia of Polymer Science and Technology, Vol. 13, John Wiley & Son, Inc., New York (1970), p. 400, and in references cited therein, as well as in the above-mentioned British Pat. No. 1,180,085, page 3. In the same references, the standard calculations used to measure average particle size and membrane thickness are also outlined. By inspection also, using, for example, a 1-micron bench-mark printed in the electron photomicrographs, such as in FIGS. 1 and 2, it is easy to determine whether the discontinuous, dispersed phase meets the size requirements set forth herein.

The compositions of this invention generally consist of a mixture of two phases, the continuous phase being a matrix of polyphenylene oxide resin and styrene resin in which there is a discontinuous gel phase dispersed comprising particles of polystyrene englobed with diene rubber membranes. Two or more coalesced such globules (as shown in FIG. 2) can also be present, so long as the average particle size and other requirements are met. In addition, at least some of the membranes can be partially open, e.g., due to rupture during formation or sampling. It is important that the particles dispersed in ones and twos, such as shown in FIG. 2, comprise at least 50% and preferably at least 65% of the total number of rubber particles.

The membrane thickness will be less than ¼ the diameter of the respective particle. If the particle is 0.1 micron in diameter, the maximum membrane thickness will be 0.025 microns. For a 0.7 micron particle, the thickness will be 0.175 microns, maximum. These parameters are controlled by the processing, as will be explained later.

The present compositions are prepared by combining such a rubber modified polystyrene resin with the polyphenylene ether. The particles of the elastomer enveloping polystyrene are provided e.g., by polymerizing styrene in the presence of dissolved rubber under conditions to be specified whereby a continuous phase of such particles becomes dispersed in a polystyrene matrix. This rubber modified polystyrene resin is then examined as described, and the average particle size is adjusted, if necessary, with an appropriate amount of "large particle" or "small particle" rubber modified polystyrene, if necessary, prior to combining with the polyphenylene ether. The particle size and form in the final composition is kept substantially the same by using blending techniques, e.g., extrusion or milling, which avoid particle degradation.

The polyphenylene ethers with which this invention is concerned are fully described in the above-mentioned references. The polyphenylene ethers are self-condensation products of monohydric monocyclic phenols produced by reacting the phenols with oxygen in the presence of complex copper catalysts. In general, molecular weight will be controlled by reaction time, longer times providing a higher average number of repeating units.

A preferred family of polyphenylene ethers will have repeating structural units of the formula

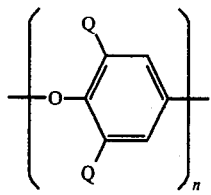

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atoms, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

Illustrative members are: poly(2,6-dilauryl-1,4-phenylene) ether; poly(2,6-diphenyl-1,4-phenylene)ether; poly(2,6-dimethoxy-1,4-phenylene)ether; poly(2,6-diethoxy-1,4-phenylene)ether; poly(2-methoxy-6-ethoxy-1,4-phenylene)ether; poly(2-ethyl-6-tearyloxy-1,4-phenylene)ether; poly(2,6-dichloro-1,4-phenylene) ether; poly(2-methyl-6-phenyl-1,4-phenylene)ether; poly(2,6-dibenzyl-1,4-phenylene)ether; poly(2-ethoxy-1,4-phenylene)ether; poly(2-chloro-1,4-phenylene)ether; poly(2,5-dibromo-1,4-phenylene)ether; and the like. Examples of polyphenylene ethers corresponding to the above formula can be found in the above referenced patents of Hay and Stamatoff.

For purposes of the present invention an especially preferred family of polyphenylene ethers include those having alkyl substitution in the two positions ortho to the oxygen ether atom, i.e., those of the above formula wherein each Q is alkyl, most preferably having from 1 to 4 carbon atoms. Illustrative members of this class are: poly(2,6-dimethyl-1,4-phenylene)ether; poly(2,6-diethyl-1,4-phenylene)ether; poly(2-methyl-6-ethyl-1,4-phenylene)ether; poly(2-methyl-6-propyl-1,4-phenylene)ether; poly(2,6-dipropyl-1,4-phenylene)ether; poly(2-ethyl-6-propyl-1,4-phenylene)ether; and the like.

The most preferred polyphenylene ether resin for purposes of the present invention is poly(2,6-dimethyl-1,4-phenylene)ether. This resin readily forms a compatible and single phase composition with the relevant polystyrene resins over the entire range of combining ratios.

Suitable polystyrene matrix resins are derived from a monovinyl aromatic monomer, e.g., one having the formula:

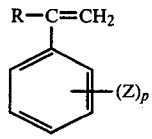

wherein R is hydrogen, (lower)alkyl, e.g., of from 1 to 4 carbon atoms or halogen; Z is hydrogen, vinyl, halogen or (lower)alkyl; and p is 0 or a whole number of from 1 to 5. Illustrative polystyrene matrix resins include homopolymers of polystyrene; polychlorostyrene; poly-α-methylstyrene, polyvinyl toluene; and the like, or mixtures of the foregoing. These resins will also comprise the inclusions in the diene rubber membrane envelopes. The most preferred polystyrene is homopolystyrene.

The "rubber" used to envelope the polystyrene resin and provide the disperse phase includes polymeric materials, natural and synthetic, which are elastomers at room temperatures, e.g., 20° to 25° C. The term "rubber" includes, therefore, natural or synthetic rubbers of the diene elastomer type generally used in preparing impact polymers. All such rubbers will form a two phase system with the polystyrene resin, and will comprise the discontinuous phase in the impact resistant polystyrene resin composition. Illustrative rubbers for use in this invention are natural rubber and polymerized diene rubbers, e.g., polybutadiene, polyisoprene, and the like, and copolymers of such dienes with vinyl monomers, e.g., vinyl aromatic monomers, such as styrene. Examples of suitable rubbers or rubbery copolymers are natural crepe rubber, synthetic SBR type rubber containing from 40 to 98% by weight of butadiene and from 60 to 2 percent by weight of styrene prepared by either hot or cold emulsion polymerization, synthetic GR-N type rubber containing from 65 to 82 percent by weight of butadiene and from 35 to 18 percent by weight of acrylonitrile, and synthetic rubbers prepared from, for example, butadiene, butadiene-styrene or isoprene by methods, e.g., those employing heterogeneous catalyst systems, such as a trialkylaluminum and a titanium halide. Among the synthetic rubbers which may be used in preparing the present compositions are elastomeric modified diene homopolymers, e.g., hydroxy- and carboxy-terminated polybutadienes; polychlorobutadienes, e.g., neoprenes; copolymers of dienes, e.g., butadiene and isoprene, with various comonomers, such as alkyl unsaturated esters, e.g., methyl methacrylate; unsaturated ketones, e.g., methylisopropenyl ketone, vinyl heterocyclics, e.g., vinyl pyridine; and the like. The preferred rubbers comprise polybutadiene and rubbery copolymers of butadiene with styrene. Such preferred rubbers are widely used in forming rubber modified high impact polystyrene resins with a broad range of properties.

A suitable method for preparing the rubber modified polystyrene used in the present compositions is derived from the general disclosure in the above-mentioned British Pat. No. 1,180,085, which deals with copolymers of methyl methacrylate and styrene and does not suggest their use in combination with any other thermoplastic, especially not polyphenylene ether.

In general, from 1.0 to 10 parts by weight of a diene rubber will be mixed with from 99 to about 90 parts by weight of styrene monomer to form a solution or dispersion. The solution or dispersion is then polymerized in bulk in the presence of from 0.01 to 2.0 parts by weight of a monomer soluble, water-insoluble initiator, such as benzoyl peroxide, dicumyl peroxide or a mixture thereof, at a temperature, e.g., of about 40° to 150° C., until a phase inversion occurs in which droplets of the homopolystyrene surrounded by the diene rubber membrane envelope are dispersed in a discontinuous phase. At this point, between about 5 and 35% of the styrene monomer has been polymerized. If necessary, the average particle size is adjusted by adding an appropriate quantity of a prepolymer solution having droplets of greater or smaller average particle size. Then the prepolymer system is either subjected to aqueous supension polymerization or to a bulk polymerization without substantial stirring, using in either case the same or different initiator and a temperature in the range of, for example, 40° to 150° C., and for the suspension case a suspending agent, such as barium sulfate, calcium phosphate, polyvinyl alcohol, a polyacrylate salt, or the like.

A typical procedure for making a useful rubber-modified styrene resin with the specified morphology will be given hereinafter.

As is described in the above-mentioned U.S. Pat. No. 3,383,435, polyphenylene ethers and polystyrene resins are combinable with each other in all proportions and they exhibit a single set of thermodynamic properties. The present compositions therefore can comprise from 1 to 99% by weight polyphenylene ether resin and from 99 to 1% by weight polystyrene resin, and these are included within the scope of the invention. In general, compositions in which the polyphenylene ether resin comprises from about 20 to about 80% by weight of the total resinous components, are preferred because after molding they have the best combination of impact strength, surface appearance and resistance to solvents. Particularly useful and preferred are compositions in which the polyphenylene resin component comprises from 40 to 60% by weight of the combined weight of the total resinous components in the composition. Properties, such as flexural strength, tensile strength, hardness and especially impact strength and light transmission appear to be at a maximum in such preferred compositions.

The method used to form the compositions of the invention is not critical provided that it permits efficient dispersion and mixing. The preferred method is one in which the polyphenylene ether is mixed with the rubber modified polystyrene using any conventional mixing method and the composition so formed is molded to any desired shape such as by extrusion, hot molding, injection molding, and the like.

It should, of course, be obvious to those skilled in the art that other additives may be included in the present compositions such as plasticizers, pigments, flame retardent additives, reinforcing agents, such as glass filaments or fibers, stabilizers, and the like.

The following procedure illustrates the preparation of a rubber modified polystyrene resin suitable for use in the present invention. A section of the material is shown under magnification of 30,000 diameters in FIG. 2.

A prepolymer is prepared by polymerizing for 6 hours at 87° C.;

| Ingredients | Parts by weight |
|---|---|
| styrene monomer | 460 |
| polybutadiene rubber* | 30 |
| 3,5-di-t-butyl phenol | 1 |
| benzoyl peroxide | 0.5 |
| dicumyl peroxide | 0.5 |

*Phillips Petroleum Co., Solprene 203, a polybutadiene having a microstructure comprising, typically, about 38% cis-1,4-; 53% trans-1,4- and about 9% vinyl units.

The prepolymer is then suspended in 1000 g. of water containing 5 g. of gelatin, 5 g. of mineral oil and 0.5 g. of sodium lauryl sulfate and polymerization is completed in an autoclave at 125° C. for 14.5 hours with slow agitation. The product in the form of beads is separated by cooling and filtering the reaction mixture, then the beads are washed and vacuum-dried.

The rubber content is about 6% by weight; the rubber particle size ranges from 0.1 to 0.7 microns; and a ⅛" compression molded specimen has a notched Izod impact strength of 0.96 ft.-lbs./in.

DESCRIPTION OF THE PREFERRED EMBODIMENTS

The advantages obtained by providing compositions of a polyphenylene ether resin and a rubber modified polystyrene of the specified morphology are set forth in the following examples which further illustrate the invention but are not to be construed as limiting the invention.

EXAMPLE 1

The following formulation is mechanically blended then co-extruded in a ¾" Wayne-type extruder and molded into test pieces in a 3 oz. Newbury injection molding machine. The physical tests are carried out by the following procedures: ⅛" notched Izod Impact Strength, ASTM D-256; and elongation at break, ASTM D-639. For comparison purposes, control specimens are also prepared. The ability of the ⅛ inch molded specimens to transmit light is also observed. The results are set forth in the Table.

TABLE

Composition of Polyphenylene Ether and Rubber Modified Polystyrene Resins

| | Example | | |
|---|---|---|---|
| | 1 | 1A[a] | 1B[a] |
| Ingredients (parts by weight) | | | |
| poly(2,6-dimethyl-1,4-phenylene)ether[b] | 40 | 40 | 40 |
| rubber modified polystyrene, small, 0.1–0.7 micron particles, membrane encapsulated (FIG. 2)[c] | 60 | — | — |
| rubber modified polystyrene, 0.5–2 micron particles, many inclusions (similar to FIG. 1)[d] | — | 60 | — |
| rubber modified polystyrene, <0.5 micron particles, many inclusions, 50% rubber[e] | — | — | 60 |
| Properties | | | |
| Light transmission | Transparent | Opaque | Opaque |
| Elongation, % | 48 | 36.6 | 33.8 |
| Izod impact strength, ft.-lbs./in. notch | 2.85 | 1.9 | 7.2 |

[a]Control
[b]General Electric Company, PPO in powder form, intrinsic viscosity, 0.40–0.65 dl./g.
[c]Polystyrene matrix, prepared by above-mentioned bulk prepolymerization-suspension polymerization procedure, containing about 6% rubber.
[d]Monsanto Company HT-91 high impact polystyrene containing about 8 wt. % polybutadiene, suspension grafted, about 95% of the particles being greater than 0.5 microns in size.
[e]Interpolymerization product of an emulsion of a poly-diene rubber latex (30% solids) 200 parts by weight, styrene 60 parts, potassium persulfate 2 parts, water 80 parts, polymerized at 45° C. for 18 hrs., coagulated, washed and dried.

It is seen that the composition according to this invention is transparent, and has a higher elongation than that of either of the controls, the latter property showing less brittleness. The composition according to this invention has a higher impact strength even with about 25% less rubber content than that of control specimen 1A (control specimen 1B has a much greater impact strength—but the rubber content is about 8 times as high).

It is noteworthy that the composition of Example 1 is transparent, even though the refractive index of the polystyrene matrix is 1.59 and that of the diene rubber is 1.54, a difference of 0.05 units, a ten-fold excess over the maximum difference of 0.005 units stated to be critical to transparency and enhanced impact strength in British Pat. No. 1,180,085. Tensile strength and yield are, respectively, 8100 and 10200 psi.

Other modifications can be made, based on the teachings of the foregoing specific examples.

For example, if the procedure of Example 1 is repeated, substituting for the polystyrene modified with polybutadiene, a polystyrene containing 6% by weight of rubber derived from a rubbery styrene butadiene copolymer containing 77% of butadiene units and 23% of styrene units, by weight, a composition according to this invention will be obtained.

If the procedure of Example 1 is repeated and the following polyphenylene ethers are substituted for poly(2,6-dimethyl-1,4-phenylene)ether in the formulation:
poly(2,6-diethyl-1,4-phenylene)ether;
poly(2-methyl-6-ethyl-1,4-phenylene)ether;
poly(2-methyl-6-propyl-1,4-phenylene)ether;
poly(2,6-dipropyl-1,4-phenylene)ether; and
poly(2-ethyl-6-propyl-1,4-phenylene)ether,
compositions according to this invention will be obtained.

Obviously, other modifications and variations of the present invention are possible in the light of the above teachings. It is, therefore, to be understood that changes may be made in the particular embodiments of the invention described which are within the full intended scope of the invention as defined by the appended claims:

We claim:

1. A high impact strength thermoplastic composition comprising:
(a) from about 20 to about 80 percent by weight of a polyphenylene ether resin; and
(b) from about 80 to about 20 percent by weight of a rubber modified polystyrene resin, said rubber modified polystyrene comprising a polystyrene matrix in which there is uniformly dispersed a discontinuous phase comprising particles of a styrene homopolymer englobulated in a diene rubber membrane, said particles having an average size ranging from about 0.1 to about 0.7 microns, the membrane thickness being not in excess of about ¼th the average particle diameter, the diene rubber content being from about 1 to about 10% by weight of the rubber modified polystyrene.

2. A composition as defined in claim 1 wherein said rubber modified polystyrene resin contains from about 3 to about 8% by weight of said diene rubber.

3. A composition as defined in claim 1 wherein said diene rubber is a polybutadiene or a rubbery copolymer of styrene and butadiene.

4. A composition as defined in claim 4 wherein said polyphenylene ether resin comprises from 40 to 60% by weight of the combined weight of the total resinous components in the composition.

5. A composition as defined in claim 1 wherein said polyphenylene ether has the repeating structural formula:

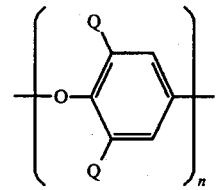

wherein the oxygen ether atom of one unit is connected to the benzene nucleus of the next adjoining unit, n is a positive integer and is at least 50, and each Q is a monovalent substituent selected from the group consisting of hydrogen, halogen, hydrocarbon radicals free of a tertiary alpha-carbon atom, halohydrocarbon radicals having at least two carbon atoms between the halogen atom and the phenyl nucleus, hydrocarbonoxy radicals and halohydrocarbonoxy radicals having at least two carbon atoms between the halogen atom and the phenyl nucleus.

6. A composition as defined in claim 5 wherein Q is alkyl having from 1 to 4 carbon atoms.

7. A high impact strength thermoplastic composition comprising:
(a) from about 20 to about 80 percent by weight of a polyphenylene ether resin having the repeating structural formula:

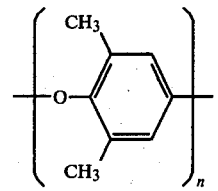

wherein the oxygen ether atom of one unit is connected to the benzene nucleus of the next adjoining unit, and n is a positive integer and is at least 50; and
(b) from about 80 to about 20 percent by weight of a rubber modified polystyrene resin, said rubber modified polystyrene comprising a polystyrene matrix in which there is uniformly dispersed a discontinuous phase comprising particles of a styrene polymer englobulated in a diene rubber membrane, said particles having an average size ranging from about 0.1 to about 0.7 microns, the membrane thickness being not in excess of about ¼th the average particle diameter, the diene rubber content being from about 1 to about 10% by weight of the rubber modified polystyrene.

* * * * *